(12) United States Patent
Thuo et al.

(10) Patent No.: US 11,613,630 B2
(45) Date of Patent: Mar. 28, 2023

(54) SOLID DRY-TYPE LUBRICANT

(71) Applicant: Iowa State University Research Foundation, Inc., Ames, IA (US)

(72) Inventors: Martin Thuo, Ames, IA (US); Paul Ramon Gregory, Ames, IA (US); Boyce S. Chang, El Cerrito, CA (US); Chuanshen Du, Ames, IA (US)

(73) Assignee: Iowa State University Research Foundation, Ames, IA (US)

( * ) Notice: Subject to any disclaimer, the term of this patent is extended or adjusted under 35 U.S.C. 154(b) by 203 days.

(21) Appl. No.: 17/110,939

(22) Filed: Dec. 3, 2020

(65) Prior Publication Data

US 2022/0177676 A1    Jun. 9, 2022

(51) Int. Cl.
| | |
|---|---|
| *C08K 9/06* | (2006.01) |
| *B65G 47/44* | (2006.01) |
| *C08K 5/01* | (2006.01) |
| *C08K 7/02* | (2006.01) |
| *C08L 1/02* | (2006.01) |

(52) U.S. Cl.
CPC ............ *C08K 9/06* (2013.01); *B65G 47/44* (2013.01); *C08K 5/01* (2013.01); *C08K 7/02* (2013.01); *C08L 1/02* (2013.01); *C08K 2201/016* (2013.01); *C08K 2201/018* (2013.01)

(58) Field of Classification Search
None
See application file for complete search history.

(56) References Cited

U.S. PATENT DOCUMENTS

| 9,724,342 B2 | 8/2017 | Wilson et al. |
| 10,471,469 B2 | 11/2019 | Thuo et al. |
| 10,604,677 B2 | 3/2020 | Thuo et al. |

(Continued)

FOREIGN PATENT DOCUMENTS

| CA | 879053 A | 8/1971 |
| EP | 3138676 A1 | 3/2017 |

OTHER PUBLICATIONS

Stephanie Oyola-Reynoso, et al: "Surface polymerization of perfluorosilane treatments on paper mitigates HF production upon incineration," Iowa State University Digital Repository, The Royal Society of Chemistry 2016, Accepted Aug. 21, 2016, DOI: 10.1039/c6ra20582h.

(Continued)

*Primary Examiner* — Jeffrey D Washville
(74) *Attorney, Agent, or Firm* — Tucker Ellis LLP; Michael G. Craig; Heather M. Barnes

(57) ABSTRACT

One or more techniques and/or systems are disclosed for a dry-type lubricant for use in a dry product hopper to help improve dry product flow and to improve anti jamming properties of the dry product. The example lubricant can comprise a hydrophilic fiber, such as cellulose, having a width to length aspect ratio that provides a thin fiber. A plurality of hydrophobic particles are deposited on the surface of the fiber, resulting in a fiber surface exhibiting amphiphobic properties. Further, the fiber can operably absorb water, and then releases the absorbed water to the surface of the fiber under mechanical stress, such as when mixed with a product in a hopper. This can result in the water being disposed on the surface of the fiber, to provide lubrication to a product in a hopper to improve flow and anti jamming characteristics of the product in the hopper.

10 Claims, 6 Drawing Sheets

(56) References Cited

U.S. PATENT DOCUMENTS

2005/0025967 A1 2/2005 Lawton et al.
2017/0306183 A1 10/2017 Thuo et al.

OTHER PUBLICATIONS

Stephanie Oyola-Reynoso, et al: "Recruiting Physisorbed Water in Surface Polymerization for Bio-Inspired Materials of Tunable Hydrophobicity," The Royal Society of Chemistry 2016; Dated May 21, 2020, DOI:10,1039/C6TA06446A.

Stephanie Oyola-Reynoso, et al: "Substituting Plastic Casings with Hydrophobic (Perfluorosilane treated) paper improves Biodegradability of Low-Cost Diagnostic Devices," Industrial Crops and Products, Accepted Aug. 28, 2016; Retrieved from the internet: URL: www.elsevier.com/locate/indcrop.

Extended European Search Report and Written Opinion issued in European Patent Application No. 21205566.9, dated May 16, 2022, in 10 pages.

SOLID DRY-TYPE LUBRICANT

BACKGROUND

A product dispensing and/or distribution system can be used to dispense or distribute a target product. As an example, an agricultural planter may comprise a hopper filled with target seed that is dispensing and plated into a field during operation. Further, a cosmetic or pharmaceutical dispensing system may be used during production of a target product; and a food ingredient dispending system may be used to dispense a target ingredient during production of a particular food item. In these example, the various products can be subjected to friction and mechanical stresses that lead to clumping, jamming, doming, and other flow-related problems, which can lead to undesired dispensing issues.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a dry-type lubricant for use in a dry product hopper to help improve dry product flow and to improve anti-jamming properties of the dry product. The addition of a dry lubricant can help mitigate jamming, and can improve flow of the product. For example, a lubricant can provide lubrication properties when mechanical stress is applied, such as weight or pressure applied by the product stacked in the hopper, or when electrostatic charges are generated by friction. In this implementation, the mechanical stress can result in water moving from inside the lubricant to the outside of the lubricant, which provides anti-jamming properties and improves flow of the product in the hopper. Further, the surface properties of the lubricant may provide for dissipation of the charge build-up.

In one implementation a lubricant for use in a hopper fed system can comprise a hydrophilic fiber having a width to length aspect ratio of at least greater than 1. Further, a plurality of hydrophobic particles can be respectively disposed on the surface of the fiber, resulting in a fiber surface exhibiting amphiphobic properties. In this implementation, the fiber can operably absorb water, and releases the absorbed water to the surface of the fiber under mechanical stress. This can result in the water being disposed on the surface of the fiber, thereby operably providing lubrication to a product in a hopper to improve flow and anti jamming characteristics of the product in the hopper.

In another implementation of an example fiber-based lubricant, the fibers can comprise a positive charge. Further, a plurality of particle disposed on the surface of the fiber can comprise a negative charge. The combination of the positively charged fiber and negatively charged particles provides for the lubricant to operably mitigate charges that may build up on a surface of a flowing product when subjected to friction, by discharging the electrostatic charge from either the surface of the fiber or the attached particles. The dissipation of charges can provide for improved flow and mitigate doming, jamming and other product flow issues in a dispensing or distribution system. Alternately, the fibers can comprise a negative charge. And the plurality of particle disposed on the surface of the fiber can comprise a positive charge, to achieve a similar result.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
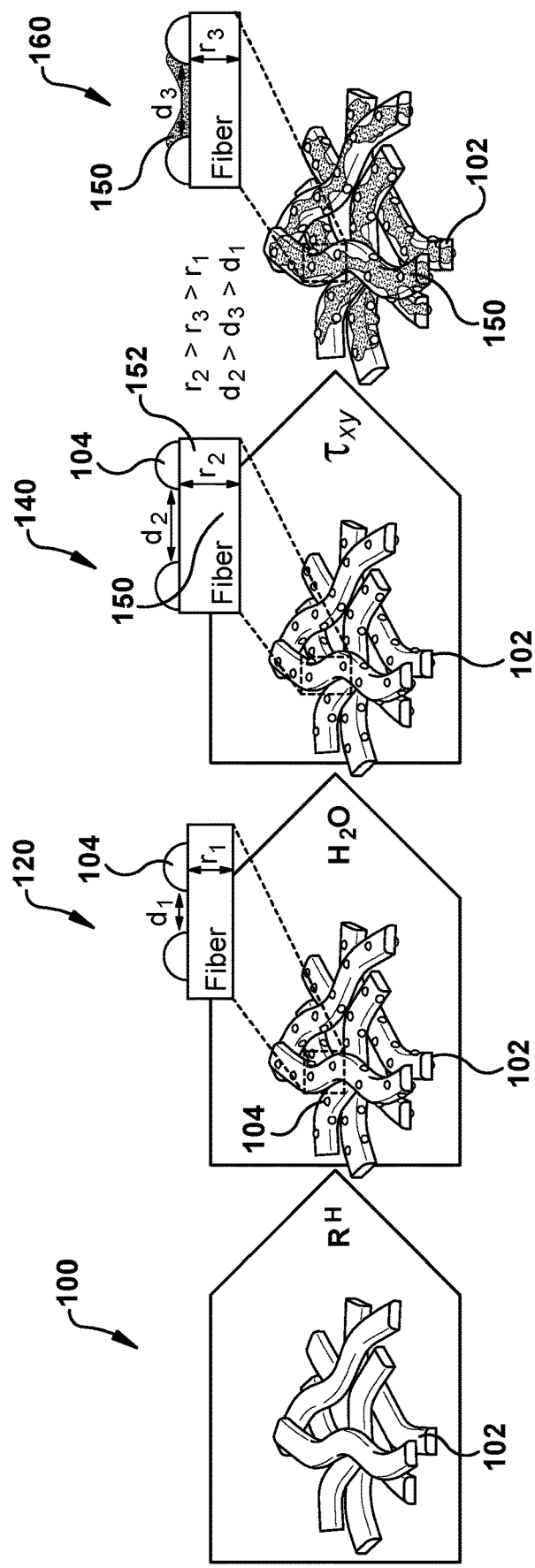
FIG. 1 is a component diagram illustrating one implementation of an example lubricant described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect a lubricant can be devised for use in a dry product hopper to help improve dry product flow and to improve anti-jamming properties of the dry product. That is, for example, some dry products are susceptible to jamming in a hopper, and/or may not flow effectively during dispensing from the hopper. A dry product, such as a seed, can jam together to form a blockage that can slow down dispensing of the product from the hopper. The addition of a dry lubricant can help mitigate jamming and can improve flow of the product. In one implementation, a lubricant can provide lubrication properties when mechanical stress is applied, such as weight or pressure applied by the product stacked in the hopper. In this implementation, the mechanical stress can result in water moving from inside the lubricant to the outside of the lubricant, which provides anti jamming properties and improves flow of the product in the hopper.

Often, a lubricant may be desirable to improve flow of a product, such as seed, fertilizer, or some other pellet-shaped product, from the hopper to a dispensing or output location. In this example, if there is only one point of contact with the product jamming can occur. However, if there are more points of contact that are spread out over a larger surface area, jamming can be mitigated. As such, as described herein, a lubricant product that comprise a relatively thin aspect ratio (e.g., greater than 1 length to width; length greater than width), such as a fiber, can distribute stress forces linearly to help spread out the stress forces. Further, certain cross-section shapes of a fiber lubricant may provide improved stress force distribution over others. For example, while rectangular, or other polygonal cross-sectional shapes may provide for good stress re-distribution, a cylindrical cross-section shape may provide superior stress force distribution, and therefore, improved lubricity.

In one implementation, in this aspect, as illustrated in FIG. 1, a lubricant can comprise a fiber 102 that has a width to length aspect ratio of at least greater than 1 length to width. That is, for example, the length of the fiber 102 can be at least greater than the width of the fiber. In some implementations, the width to length aspect ratio can comprise a ratio in the range from 1:1.1 to 1:15 (e.g., 1:4). In other implementation, the width to length aspect ratio may be higher than 1:15, or lower than 1:1.1. As an example, the length to width aspect ratio may be determined by the type of fiber 102, the source of the fiber 102, and/or the method of processing the fiber 102.

In some implementations, the fiber can comprise a natural biodegradable polymer, such as cellulose, starch, lignin, collagen, silk, and/or protein. In other implementations, the fiber can comprise (e.g., or further comprise) a synthetic biodegradable polymers such as polyglycolic acid (PGA), polylactic acid (PLA), polycaprolactone (PCL), polydioxanone (PDS), and/or polyhydroxybutyrate (PHB). It is anticipated that those skilled in the art may devise a lubricant that comprises materials other than the materials described herein, which comprise similar characteristics to those provided by those described. For example, the fiber comprises hydrophilic properties, such that water (e.g., or other appropriate liquid) is attracted to the fiber, and may be absorbed by the fiber. Further, for example, the fiber may comprise reactive moieties, such as hydroxyl groups, disposed on the surface of the fiber. In these examples, fibers that provide similar properties may be used instead of or in conjunction with these fibers. Further, it should be appreciated that the fiber(s) can be selected based upon the intended use. That is, for example, biodegradable fibers of a certain type may be used in a seed planter based on the properties of the seeds, the type of equipment used, and the environment. As another example, food safe fibers may be chosen for use in food product manufacture or dispensing systems; and those that are safe for use, and approved by an appropriate agency, could be used in cosmetic or pharmaceutical manufacture or dispensing.

In FIG. 1, the lubricant can further comprise a plurality of hydrophobic particles 104 respectively disposed on the surface of the fiber 102. The resulting fiber has a fiber surface that exhibits amphiphobic properties. That is, for example, the lubricant fiber 102 can display both hydrophilic and hydrophobic properties. As one example, a cellulose base of the fiber 102 may be hydrophilic, while the hydrophobic particles 104 disposed on the surface are hydrophobic. In this way, a liquid 150, such as water, that is disposed in the core of the cellulose fiber can be expressed to the surface under pressure and disposed as a thin layer on the surface of the fiber 102, such as disposed between and/or around the hydrophobic particles 104. For example, the lubricant can be utilized in a product dispenser, and when the lubricant is subjected to mechanical stress, it may provide lubricity to the product, to improve flow of the product in and from the dispenser.

In some implementations, other liquids (e.g., other than water) may be used to provide lubrication as appropriate, such as glycol, glycerine, oils, and low melting-point solids (e.g., waxes) that can be readily adsorbed from the core of the fiber to the surface. For example, alternates to water, such as glycol and glycerine, may be useful in humid environments where over hydration with water can result in clustering of the lubricant and/or product. In some implementations, the liquid disposed in the core of the fiber can be Newtonian or non-Newtonian, which can be determined by the magnitude of stress that is needed to trigger the adsorption of the liquid to the surface from the core. In some implementations, the liquid can comprise an apriori physisorbed, low-modulus material that can be tuned to be released to the surface of the fiber based on the magnitude of stress provided. That is, for example, the lubricity of the fiber can be autonomously self-adjusted based on the magnitude of stress by releasing such a material to the surface to alter the surface chemistry and increase lubricity. In this example, the alteration of the surface chemistry can be reversed upon reduction of the stress, thereby absorbing the material into the core of the fiber, and reverting the surface to an amphiphobic state (e.g., 140 of FIG. 1).

It should be appreciated that the term lubricant, lubrication, and/or lubricity are used to describe properties that include, but are not limited to, minimizing and/or mitigating friction for the product being dispensed. That is, between individual product particles, the product and a container in which they are held or dispensed, the product and other parts of a dispensing systems, such as tubes/piping/plumbing, valves, dispensing mechanicals, and/or other parts where jamming, doming, clumping, clustering, flow disruption, or otherwise a perturbed flow of the product through the system may occur. Lubrication can be provided by the fiber properties, a liquid disposed on the surface of the fiber, by the amphiphobic properties of the lubricant, and/or by mitigating a static electric charge build-up (e.g., charge dissipation) in the product or parts of the dispensing system in which the product traverses.

As an illustrative example, FIG. 1 illustrates four example phases 100, 120, 140, 160 of one implementation of the innovation described herein. In phase 100, the fibers 102 (e.g., cellulose fibers) are in an untreated condition. In this example, between phase 100 and 120, the fibers 122 have been treated ($R^H$), as will be discussed below, to form the hydrophobic particles 104 on the surface of the fibers 102. As illustrated at 120, the hydrophobic particles 104 can be disposed at a first distance $d_1$ from each other, and the fiber 102 can have a first width $r_1$. Further, in phase 120, the fibers 102 have not been treated with additional liquid such as water. At phase 140, the fibers have been treated with water 150, such that the water 150 is absorbed into the fiber body 152, as the fiber body can be hydrophilic. Additionally, in this phase 140, the particles 104 can be disposed at a second distance $d_2$ from each other, and the fiber 102 can have a second width $r_2$. As an example, the second distance $d_2$ can be greater than the first distance $d_1$, and the second width $r_2$ can be greater than the first width $r_1$, which may be due the absorption of the water 150.

In FIG. 1, in phase 160, the fibers 102 are subjected to stress (e.g., $\tau_{xy}$), which results in the water 150 being expressed to the surface of the fiber 102 from the body 152 of the fiber 102. In this example, the water 150 can be disposed between hydrophobic particles 104, on the surface of the fiber 102. Further, as illustrated in this phase 140, the particles 104 can be disposed at a third distance $d_3$ from each other, and the fiber 102 can have a third width $r_3$. As an example, the third distance $d_3$ can be greater than the first distance $d_1$, and less than the second distance dz. Additionally, the third width $r_3$ can be greater than the first width $r_1$, and less than the second width $r_2$. In this example, the water 150 has been adsorbed to the surface due to stress ($T_{xy}$) applied to the fibers 102, essentially expressing the water internally from the fibers 102 to the surface, thereby reducing the fiber width (r) and particle distance (d).

As one example, treated fibers that comprise hydrophobic particles disposed on the fibers' surfaces can be exposed to water such that the water is absorbed into the treated fibers. In this example, the now water-absorbed, treated fibers may be used as a lubricant in a product dispenser to improve the product flow in the dispenser. That is, a target product, such as a seed, food product, pharmaceutical, etc. can be introduced into a product dispenser, such as a seed hopper on a planter, in combination with a desired amount of the water-absorbed, treated fibers lubricant. For example, a desired amount of the lubricant used with the product can be dependent on a size of the product, size of the product dispenser, configuration of the product dispenser, and/or the amount of product in the dispenser.

As an example, as little as one quarter cup per bushel of the lubricant may be combined with a target product in a central seed dispenser. For example, more lubricant may be utilized for non-spherical seeds (e.g., corn) where an increase in jamming may occur, and less lubricant may be utilized for spherical seeds (e.g., soybean) where less jamming is likely to occur. That is, the dosage of lubricant can be dependent on the shape and size of the seed, the desired flow speed of the seed output, and/or the type of equipment used. In this example, stress may be applied to the lubricant at locations in the dispenser where the product is exposed to stress or is likely to exhibit doming, funnel flow, and/or jamming. Such locations may comprise the walls of the dispenser, at a bottom of the dispenser, at a narrowing point in the dispenser, at sharp angles in the dispenser, etc.

In this way, in this example, as a stress force is applied, the apriori absorbed liquid can be exuded to the surface between and around the hydrophobic particles, improving lubricity between components of the product, improving flow and mitigating jamming/doming of the product. In one aspect, a high aspect ratio of length to width can provide a large surface area, particularly in a cylindrically-shaped fiber leading to redistribution of otherwise localized mechanical stress. In this example, in this aspect, the hydrophilic particles are relatively randomly spaced on the surface of the fiber. Further, the adsorbed liquid is dispersed on the surface of the fiber with the hydrophilic particle to create a slippery (e.g., almost oil-like) surface. This provides an increased surface lubrication, allowing the product to flow with respect to each other, to mitigate jamming and doming, to improve product flow, for example.

Figure 2:
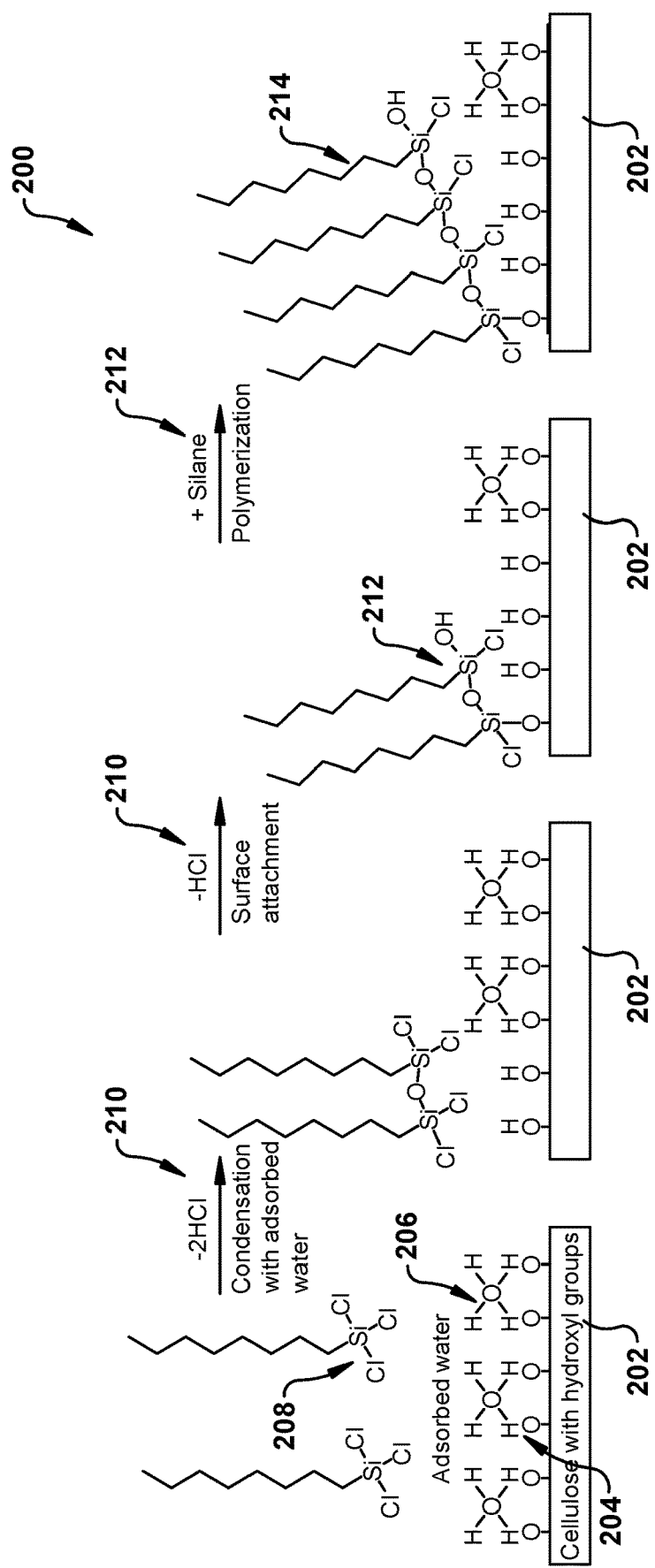
FIGS. 2A, 2B, 2C, and 2D are component diagrams illustrating one implementation of one or more portion of one or more products described herein.

In some implementations, the hydrophilic particles can comprise oligomers, such as polymers that have few repeating molecules. FIGS. 2A, 2B, 2C, and 2D are a component diagrams illustrating one example process for creating the oligomers on the surface of a fiber, such as a cellulose fiber 202. In FIG. 2A, a cellulose fiber 202 comprises hydroxyl groups 204 on its surface. In this example, adsorbed water 206 is disposed on the surface of the fiber 202. Alkyl-silane 208 can be introduced to the fiber, such as by using an appropriate carrier, which will be described in more detail below. In FIGS. 2B and 2C, the hydroxyl groups 204 and adsorbed water 206 react with the introduced alkyl-silane 208 to attach to the surface of the fiber 202, releasing hydrochloric acid 210 as condensation with the adsorbed water 206 in a vapor phase.

In FIG. 2D, the silane molecules 212 react with adsorbed water 206 to form an oligomer 212, and oligomerized silane molecules 214 reacts with surface hydroxyl groups of the cellulose to attach to the fiber 202. In this example, the resulting oligomerized silane molecules 214 can form hydrophobic particles as a polymer on the surface of the fiber. In some implementations, respective polymer particles can grow further, into a three-dimensional polymeric particle above the surface, as more adsorbed water is locally removed in this process by the silane 212. Additionally, absorbed water in the core of the cellulose fiber 202 can be expressed to the surface, resulting in continued growth of the particles in the presence of unreacted alkyl-silane 208 with the carrier.

In this way, for example, substantially randomly disposed hydrophobic particles can be formed on, and attached to the surface of the fiber 202. As an example, the number and size of the resulting hydrophobic particles may be tuned to a desired result by controlling an amount of available surface water and an amount or concentration of alkyl-silane 208 in the carrier that is used to introduce it to the fiber surface. Number and size of the hydrophobic particles can be tuned by using the carrier to tune amount of surface adsorbed water that is available to react with the alkyl-silane. In some implementations, the respective hydrophobic particles rise to height of from thirty to one-hundred and thirty nanometers from the surface of the fiber 202.

Figure 3:
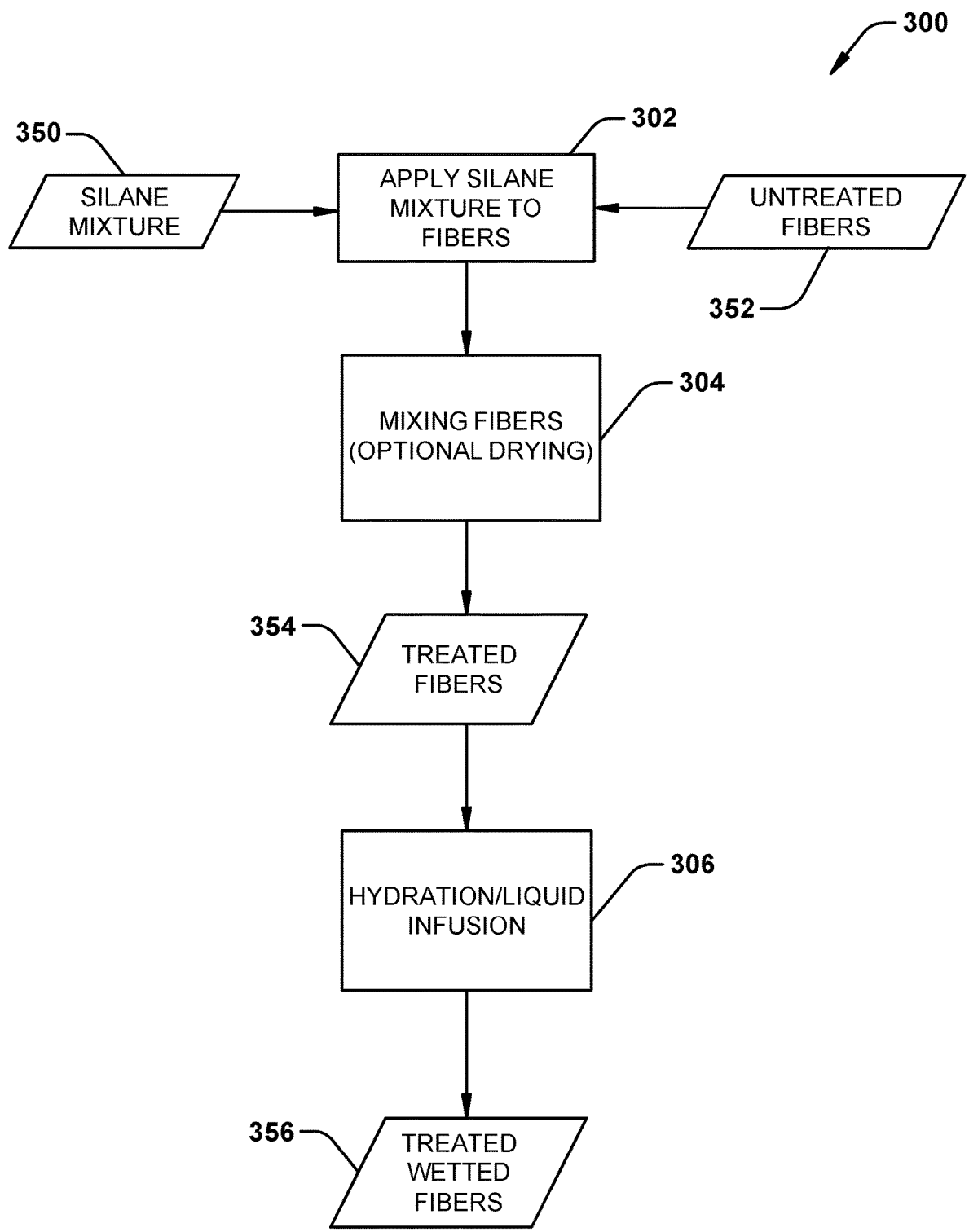
FIG. 3 is a flow diagram illustrating an example method for producing a lubricant that may be used in one or more systems described herein.

In one aspect, a method can be devised for creating a dry-type lubricant, which may be used to improve product flow in a dispenser. FIG. 3 is a flow diagram that illustrates one example implementation of a method 300 for producing a lubricant that may be used to improve product flow in a dispenser. The example method 300 begins at 302, where a silane mixture 350 is introduced to a batch of untreated fibers 352. In some implementations, the silane mixture 350 can be sprayed onto the untreated fibers 352 to lightly saturate the fibers 352. At 304, the saturated fibers can be mixed to provide for a more uniform coverage of the silane mixture 350 among the fibers 352, resulting in treated fibers 354. In some implementations, the silane mixture 350 can be introduced in the gas phase with an active or inert carrier (e.g., nitrogen) leading to chemical vapor deposition of the reactant.

In some implementations, the spraying and mixing process can optionally be performed a plurality of times (e.g., two or more) in order to provide for a more uniform coating of the fibers. In some implementations, in between respective spraying and mixing procedures, the coated fibers can optionally be allowed to, at least partially, dry. As one example, the drying time may be dependent on the amount of fibers being treated and the environmental conditions of the treatment (e.g., humidity, atmospheric pressure, temperature, etc.). Typically, this spraying, mixing and drying process may be performed at normal room temperature, at normal atmospheric conditions, or can be performed at an elevated temperature of up to 95° C. under reduced atmospheric pressure.

In the example method 300, at 306, the treated fiber can be hydrated or infused with an appropriate liquid or low-modulus component. In some implementations, this step can be optional, as the treated fibers 354 may be considered as a lubricant. For example, the hydration/liquid infusion step may not be part of the process (e.g., but may be added later if needed), such as where high stresses on the product in the container are likely (e.g., where high flow rates are used, such as when a planter is moving at >7.5 mph). For example, the fibers can be wetted/infused by spray application of and appropriate liquid, such as water. Further, the wetted/infused, treated fibers can be mixed thoroughly to promote homogenization of the hydration/infusion. For example, an appropriate amount of liquid can be sprayed onto the treated fibers to provide for a light coverage, and the fibers can be thoroughly mixed at least until a desired amount of hydration/infusion is achieved. In one implementation, the wetted, treated fibers can be mixed in a mechanical blender/mixer to provide for an appropriate consistency. Optionally, the hydrated fiber can be at least partially dried, for example, by being left in the open air (e.g., for five to twenty minutes), which may evaporate some of the bound water/liquid, if any. In this implementation, the hydration of the treated fibers results in treated fibers with liquid absorbed into the body of the fibers, as treated, wetted fibers 356. Alternately, the treated fibers 354 may be hydrated by being allowed to absorb water as water vapor (e.g., in a more humid environment), resulting in the treated, wetted fibers 356.

That is, for example, as prior illustrated in FIG. 1, at phase 140, the treated, wetted fibers comprise substantially randomly, surface disposed hydrophobic particles, with water absorbed in the body of the fiber. In some implementations, the treated wetted fibers can be used as a lubricant that is mixed with a product in a product dispenser.

In one implementation, the silane mixture can comprise trichloro-octyl-silane mixed with an appropriate (e.g., inert, non-polar), carrier fluid, such as hexane. As an example, surface energy between the non-polar carrier fluid and water on the fiber surface can be used to control the polymerization/oligomerization of the silane, as described above. In this way, for example, the attached hydrophobic particles can grow in height with the evaporation of the non-polar carrier fluid. In this example, control of water interaction with the silane can be achieved by displacement of capillary water by the non-polar carrier fluid. Further, the concentration of the silane can be controlled by the hydrophobicity (e.g., leading to a beading up) of the non-polar carrier fluid into small droplets of the silane mixture on the surface of the bound water (e.g., part of the adsorbed water layer).

As described above, the silane mixture can comprise a mixture of trichloro-octyl-silane and an inert or non-polar carrier, such as hexane or a similar fluid. For example, the silane mixture can comprise a ratio of trichloro-octyl-silane to non-polar carrier of one to ten (1:10). As one example, four milliliters of silane can be mixed with forty milliliters of n-hexane to produce the silane mixture. As another example, the silane mixture can comprise a ratio range of trichloro-octyl-silane to non-polar carrier from one to five (1:5) to one to fifteen (1:15). Alternate ratios of trichloro-octyl-silane to non-polar carrier may be used, dependent on the desired resulting hydrophobic particle arrangement (e.g., amount, distance, height, size), the type of fiber used, the type of non-polar carrier used, and the target product using the lubricant.

Figure 4:
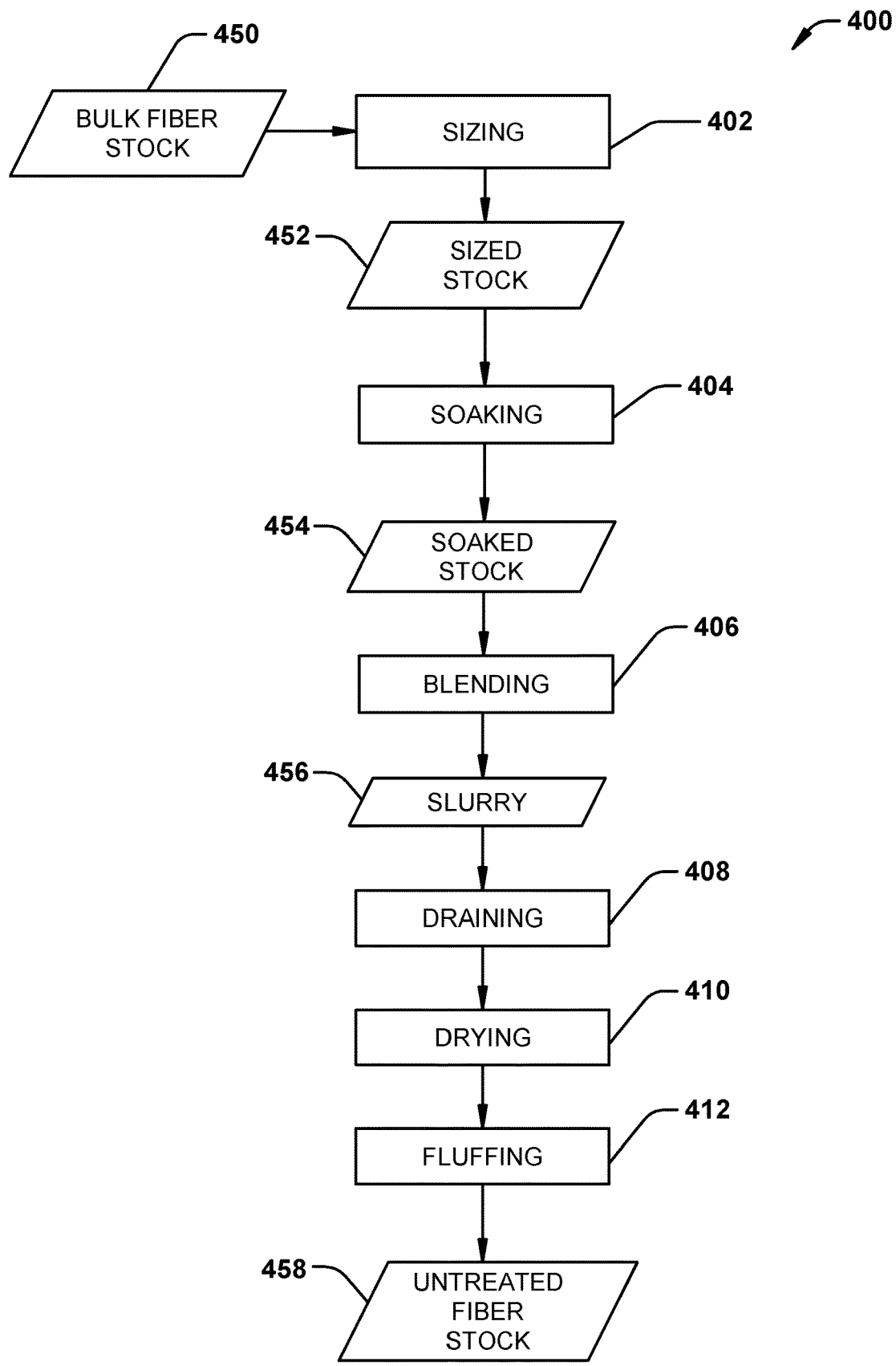
FIG. 4 is a flow diagram illustrating an example method for producing fiber stock that may be used in one or more systems described herein.

FIG. 4 is a flow diagram illustrating one implementation of an example method 400 for producing an untreated fiber that can be used in producing the treated, wetted fibers (e.g., 356). In this example method 400, the untreated fiber comprises cellulose. At 402, a bulk fiber stock 450 (e.g., cellulose-based raw material) can be appropriately sized for the remainder of the process, such as into manageable pieces. For example, a cellulose-base product such as wood, plant fiber, paper, etc. comprising a desirable fiber type can be obtained as a bulk fiber stock 450. In this example, the bulk cellulose-based product can be broken down to smaller, appropriate sizes. In one example, bulk paper can be torn, cut or otherwise sized into pieces that are manageable for the next step (e.g., paper torn/cut into 2 inch squares). For example, an exact size is not needed, as long as pieces are easy to handle for the blending step. For example, smaller pieces may allow fibers to absorb water more rapidly and easily, thus easing the blending step.

In the example method 400, at 404, the sized stock 452 can be soaked in water at least until the sized pieces are appropriately (e.g., fully) wetted. In some implementations, the heated water can be used (e.g., as hot as practicable), which facilitate the breakdown of the fiber bundles in the sized stock 452. Further, the sized stock 452 can be agitated (e.g., mixed) in the water to improve and speed the soaking process. At 406, the soaked stock product 454, the soaked stock 454 can be blended into a fine slurry. For example, the blending should result in few or no large pieces, resulting in the fine slurry of cellulose fiber. As one example, the soaked stock 454 can be blended in an appropriate container for an appropriate amount of time (e.g., two to ten minutes), using a bladed blender (e.g., using an electric or air driven motor) that spins at or greater than 15,000 RPM. It should be appreciated that various processes can use different sizes, speeds, and other processing conditions depending on the amount of stock used, and the desired resulting amount or rate or production.

At 408 in the example method 400, the resulting slurry 456 can be drained of excess water. For example, the slurring 456 can be placed in a sieve to drain the water, could be pressed in a filter press, or otherwise have the water at least substantially removed. At 408, the drained slurry can be further dried. For example, the drained slurry can be subjected to air drying, oven drying, or some other appropriate drying process. In this implementation, the aggressiveness of drying can be tuned to the speed needed for the process, and/or production requirements.

At 412, the resulting dried fiber stock can be fluffed. For example, the dried fiber stock from step 410 may consist of semi-hard clumps of the broken-down fibers. In this example, the clumps of the broken-down fibers can be blended or otherwise run through a fluffing apparatus to produce a fiber material having cotton-ball like consistency. The clumps of the broken-down fibers can be run in a batch process, or continually fluffed in a processing line as needed. As an example, longer blending or fluffing can yield a more consistent product and helps remove any clumps. The resulting product is an untreated fiber stock 458 that may be used in the treating process (e.g., method 300).

Figure 5:
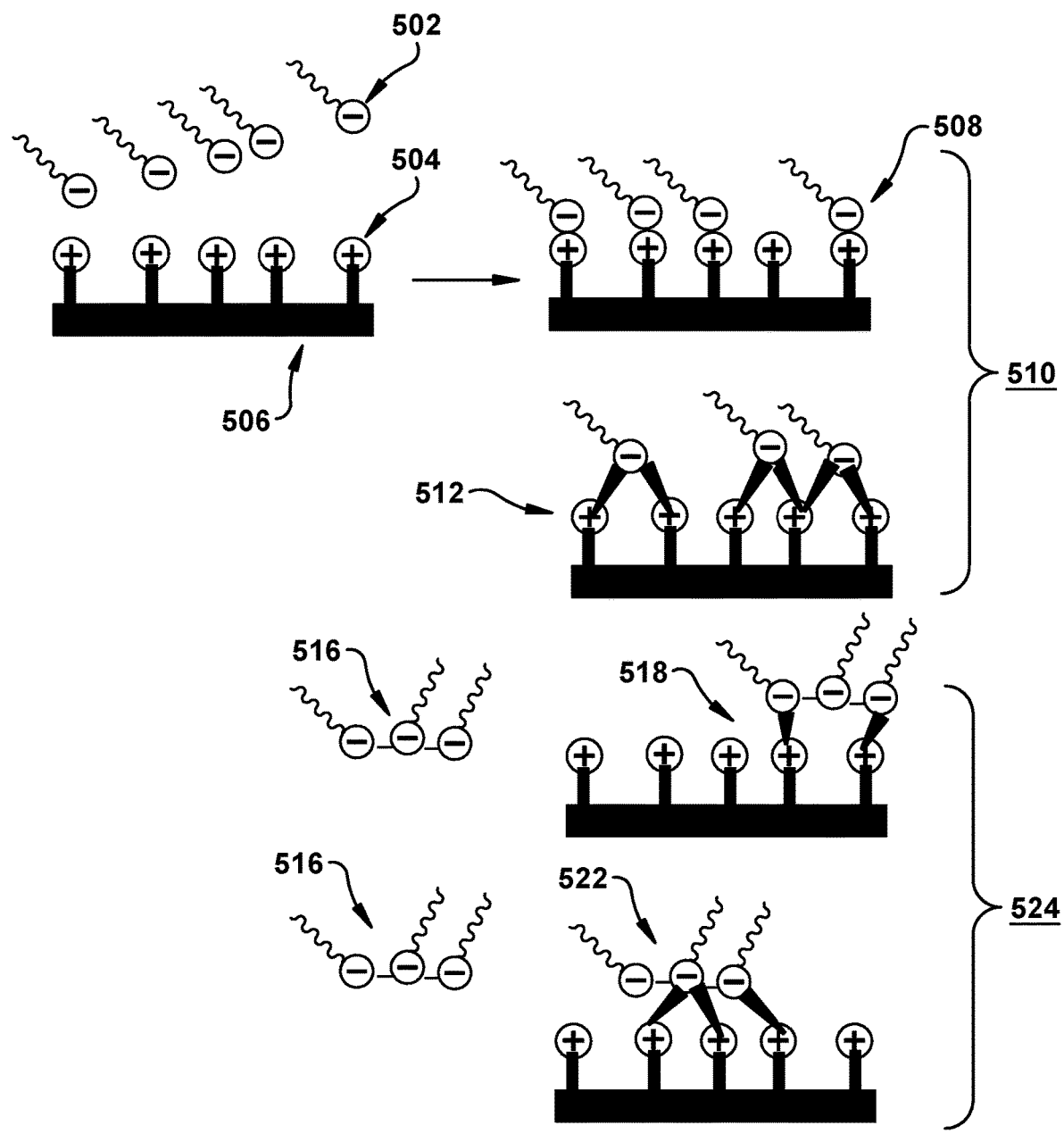
FIG. 5 is a component diagram illustrating one implementation of an example lubricant described herein.
Figure 6:
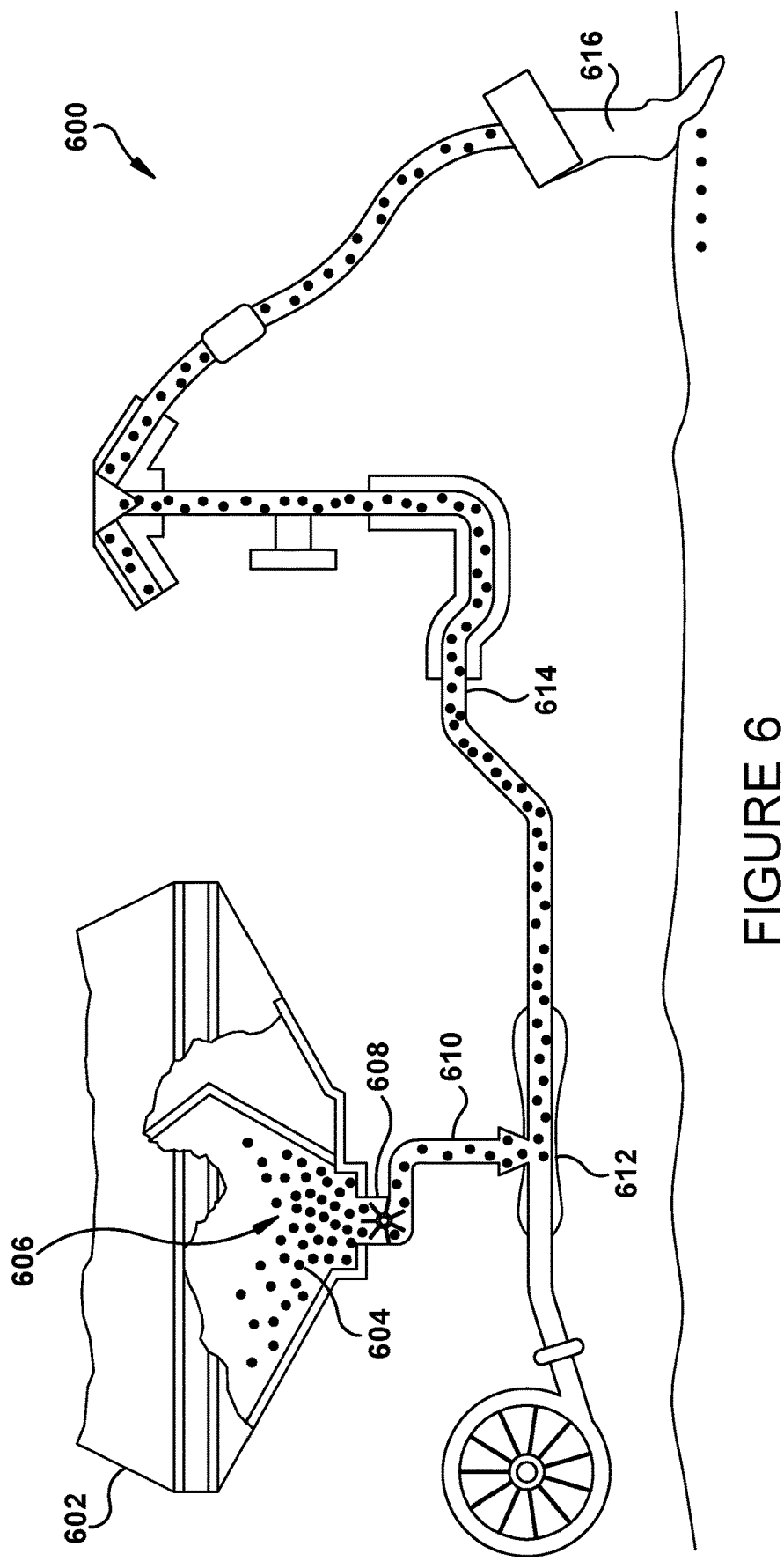
FIG. 6 is a component diagram illustrating one implementation of the use of one or more portion of one or more systems described herein.

FIG. 5 illustrates alternative implementations of example processes for creating the particles on the surface of a fiber. This example implementation illustrates formation of the hydrophobic particles without pre-oligomerization 510, and with pre-oligomerization 524. In this example, respective molecules (e.g., silane) in a first reactive group 502 may be capable of forming at least one bond with a molecule in a second reactive group, disposed on the surface of the fiber 506. In this example, the first reactive group 502 can form one bond, respectively, with the second reactive group 504 to form a group of particles 508, such comprising hydrophobic tails. In this example, there is no pre-oligomerization, and there may also be incomplete coverage of the surface with the first reactive group 502 molecules. In one implementation, the molecules of the first reactive group 502 may form bonds with more than one 512 of the second reactive group molecules 504, and may oligomerize after bonding, to form the group of particles 512 with hydrophobic tails.

In other implementations, a pre-oligomerized first reactive group 516 can react with the second reactive group 506 to form the hydrophobic particles 518 with single bond attachments, and/or 522 with multiple bond attachments.

Further, as illustrated, in the pre-oligomerized bonding 524, the resulting surface may have incomplete coverage, and/or may oligomerize further to form larger hydrophobic particles.

In one aspect, the charging properties of the resulting hydrophobic particles, in relation to the fiber, can be tuned to mitigate charge build-up or dissipate charge resulting from friction or other triboelectric effects. In some implementations, a lubricant used to facilitate flow of a product in a hopper or dispenser can comprise a fiber that acquires a positive charge when subjected to friction. Further, in this implementation, the lubricant can comprise a plurality of particles disposed on the surface of the fibers, where the particles acquire a negative charge when subjected to friction. Additionally, the combination of the positively charged fiber and negatively charged particles provides for the lubricant to operably mitigate charges that may build up on a surface of a flowing product subjected to friction, or on one or more portions of the dispensing system equipment (e.g., piping, etc.), by discharging the electrostatic charge from either the surface of the fiber or the attached particles. In this way, the flowing product can be rendered substantially neutral to improve flow and mitigate jamming, clumping, doming, funneling, or other flow issues, by reducing the electrostatic charge generated by the flow of the product. For example, this can help with dispensing (e.g., singulation or reducing dispersal) of certain powdered materials (e.g., cosmetics, pharmaceuticals), and/or other products that have surfaces susceptible to generating electrostatic charges under friction (e.g., beets, canola (rape seeds)). In some implementations, an opposite arrangement of fiber and particle can also be utilized. That, for example, is the fiber can be negatively charged (e.g. wool, fur or nylon) while the particles can be positively charge (e.g. silicon oxide particles obtained by using $SiCl_4$).

In some implementations, the fiber can comprise a natural, biodegradable material, such as cellulose, which has a weak positive charge. Further, in some implementations, the resulting particles can present a hydrocarbon surface; or a fluorinated surface. Additionally, the particles can comprise diametrically charging tails such that a net charge of the particle is zero. In some implementations, the make up of the particle may be tuned to a target use (e.g., situation, product, equipment, environments, etc.) such that the resulting particle is designed to reduce the amount of electrostatic charge that can build up in the target product, and can be dissipated. That is, for example, the molecule used in the creation of the particle on the surface of the fiber can be selected to generate a desired resulting particle. As an example, the 'tail' part of these particles can affect how they assemble and densify. In some implementations, when the tail comprises a simple hydrocarbon the molecules can pack into dense sphere.

Alternately, more functional groups can be used, and the structure can have one or more alkyl chains for example when the tail comprises a dialkyl unit. The resulting particles are packed less densely, which may allow for a particle of different densities (e.g., the chains don't pack very well when you have more than one of them per the group attaching on the surface, as described in FIG. 5). For example, this leads to particles that are 'soft," which may not build up a large electrostatic charge with friction. In some implementations, the tail of the molecules of the first reactive group (e.g., 502, 516) can be adjusted for a desired result, in order to tune the mechanical properties or charging properties of resulting particles (e.g., 508, 512, 518, 522).

FIG. 6 is a component diagram illustrating one implementation where the dry-type lubricant, as described herein, may be utilized. In this example, a dispensing device 600 (e.g., seeder) can comprise a product hopper/dispensing container 602. In operation, the hopper 602 can be filled with a target product 604, such as seed. Further, the lubricant 606, as described herein, can be mixed with the product 604 in the hopper. In this way for example, the lubricant 606 can improve flow of the product 604 inside the hopper 602, to mitigate jamming and doming. Further, the example dispensing device 600 can comprise a metering unit 610 that meters the product 604, various tubing 612, 614, and a depositing device 616. In this implementation, the lubricant may further improve flow of the product 604 through the metering device 608, the tubing 612, 614, to and out of the depositing device 616.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A lubricant for use in a hopper fed system, comprising:
a hydrophilic fiber having a width to length aspect ratio of at least one to greater than one; and
a plurality of hydrophobic particles respectively disposed on the surface of the fiber, resulting in a fiber surface exhibiting amphiphobic properties;
wherein the fiber operably absorbs a liquid, and releases the absorbed liquid to the surface of the fiber under mechanical stress, resulting in the liquid being disposed on the surface of the fiber thereby operably providing lubrication to a product in a hopper to improve flow and anti-jamming characteristics of the product in the hopper.

2. The lubricant of claim 1, the fiber comprising a biodegradable polymer, comprising one or more of: cellulose, starch, lignin, collagen, silk, protein, polyglycolic acid (PGA), polylactic acid (PLA), polycaprolactone (PCL), polydioxanone (PDS), and polyhydroxybutyrate (PHB).

3. The lubricant of claim 1, the fiber comprising one or more of: hydroxyl groups disposed on the surface, and carbonyl groups.

4. The lubricant of claim 3, comprising adsorbed water disposed on the hydroxyl groups.

5. The lubricant of claim 1, the respective particles rising to height of from thirty to one-hundred and thirty nanometers from the surface of the fiber.

6. The lubricant of claim 1, the particles comprising one or more of a silane, amide, esther, ether, and an acyl linkage.

7. The lubricant of claim 6, the silane polymerized to the surface of the fiber using adsorbed water disposed on the surface of the fiber.

8. The lubricant of claim 6, the silane deposited on the fiber surface using an inert carrier.

9. The lubricant of claim 8, the inert carrier comprising one or more of: hexane, and nitrogen gas.

10. The lubricant of claim 1, the mechanical stress comprising pressure from the product operably mixed with the lubricant resulting in the fiber releasing the absorbed water to the surface of the hydrophobic particles.

* * * * *